United States Patent
Apostol et al.

(10) Patent No.: US 9,382,659 B2
(45) Date of Patent: Jul. 5, 2016

(54) PRINTING INK AND COATING COMPOSITIONS CONTAINING STARCH

(75) Inventors: Sabino Apostol, Bergenfield, NJ (US); Robert Catena, Belleville, NJ (US); Alexander Chudolij, Clifton, NJ (US); Ana Maria A. Flores, Jersey City, NJ (US); Mathew C. Mathew, Bloomfield, NJ (US); Leda Mora, Little Ferry, NJ (US); Jeannette Simoni-Truncellito, Ridgefield Park, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 4 days.

(21) Appl. No.: 11/792,098

(22) PCT Filed: Dec. 2, 2005

(86) PCT No.: PCT/US2005/043971
§ 371 (c)(1),
(2), (4) Date: Jul. 12, 2007

(87) PCT Pub. No.: WO2006/060784
PCT Pub. Date: Jun. 8, 2006

(65) Prior Publication Data
US 2007/0289486 A1  Dec. 20, 2007

Related U.S. Application Data

(60) Provisional application No. 60/633,124, filed on Dec. 3, 2004.

(51) Int. Cl.
| | | |
|---|---|---|
| C09D 103/00 | (2006.01) |
| C09D 11/02 | (2014.01) |
| C09D 11/08 | (2006.01) |
| D21C 5/02 | (2006.01) |
| D21H 19/54 | (2006.01) |
| C09D 11/106 | (2014.01) |
| C09D 103/02 | (2006.01) |

(52) U.S. Cl.
CPC  *D21C 5/02* (2013.01); *C09D 11/08* (2013.01); *C09D 11/106* (2013.01); *C09D 103/02* (2013.01); *Y02W 30/648* (2015.05)

(58) Field of Classification Search
USPC .................................................. 106/31.39
See application file for complete search history.

(56) References Cited

U.S. PATENT DOCUMENTS

| | | | |
|---|---|---|---|
| 3,549,568 A | 12/1970 | Coscia et al. | |
| 4,113,673 A | 9/1978 | Hirota et al. | |
| 4,310,356 A * | 1/1982 | Trubiano et al. | 106/31.71 |
| 5,521,292 A | 5/1996 | Ueda et al. | |
| 5,879,509 A | 3/1999 | Sharyo et al. | |
| 6,294,013 B1 * | 9/2001 | Ortlano et al. | 106/499 |
| 6,423,775 B1 | 7/2002 | Brune et al. | |
| 6,620,880 B2 * | 9/2003 | Horley et al. | 524/842 |
| 2003/0005842 A1 * | 1/2003 | Hirschmann et al. | 101/491 |
| 2003/0073363 A1 * | 4/2003 | Ono et al. | 442/153 |

FOREIGN PATENT DOCUMENTS

| | | |
|---|---|---|
| EP | 0737774 A | 10/1996 |
| EP | 1217121 A | 6/2002 |
| GB | 2126258 A | 3/1984 |
| JP | 58-004895 A | 1/1983 |
| JP | 58-004895 A | 1/1983 |
| JP | 58-125770 A | 7/1983 |
| JP | 58125770 A * | 7/1983 |
| JP | 62-006996 A | 1/1987 |
| JP | 62-006996 A | 1/1987 |
| JP | 11-241294 A | 9/1999 |
| WO | WO 01/81008 A | 11/2001 |

OTHER PUBLICATIONS

JP 58125770, Otaguro et al, Jul. 26, 1983, English Abstract.*
European Office Action issued in counterpart EP Application No. 05 853008.0 Dated Feb. 27, 2015.

* cited by examiner

*Primary Examiner* — Colin W Slifka
(74) *Attorney, Agent, or Firm* — Charles C. Achkar; Ostrolenk Faber LLP

(57) ABSTRACT

An aqueous printing ink and coating composition contains colorant, one or more high molecular weight starches and one or more water soluble acrylic polymers or co-polymers.

20 Claims, No Drawings

PRINTING INK AND COATING COMPOSITIONS CONTAINING STARCH

BACKGROUND OF THE INVENTION

Conventional printing ink and coating compositions have been formulated to contain water based acrylic and/or polyamide polymers as a pigment binder. For example, U.S. Pat. No. 5,948,419 discloses the use of aqueous emulsion acrylic polymers to formulate nail coatings. To improve the hardness and adhesion performance properties of such nail coatings, the acrylic emulsion is reacted with an organofunctional hydrolyzable silane coupling agent. In another example, U.S. Pat. No. 6,620,880 discloses architectural coatings wherein an improvement in water resistance is achieved by employing coating formulas containing a starch which has been modified by having an acrylic monomer grafted onto it.

Where conventional formulas containing acrylic polymer and/or co-polymer as the pigment binders are used as printing inks and coatings, these formulas typically suffer from a loss in gloss, wet block resistance, shelf life viscosity stability and pH stability. Another disadvantage for ink and coating formulas using acrylic polymers and co-polymers as a pigment binder is that they require the incorporation of an excess of amine in order to maintain the solubility of the acrylate and stabilize the viscosity and pH of the formula. In addition, the unavoidable evaporative losses of amine, can inherently contribute to a pH drift in the formulation, generating odor. Ink formulas using water based polyamide polymers and co-polymers as the pigment binder exhibit similar disadvantages such as the poor repulpability of substrates or materials printed with such ink and higher initial viscosities.

Starches or polysaccharides have been used to formulate water based newsprint inks. For example, U.S. Pat. No. 4,310,356 discloses an aqueous newsprint ink formula containing carbon black pigment, a starch such as corn starch, corn dextrin or potato dextrin and a salt such as calcium chloride, which acts as a viscosity stabilizer. In such ink formula, the salt is employed to offset the viscosity increase over time caused by the starch via a process called "retrogradation" whereby the starch molecules form intermolecular associations. As such, the viscosity of the ink will depend mainly on the amount and type of starch used in the ink formula. In addition, the starch may be cross-linked by cross-linking agents such as urea-formaldehyde, ketone, resorcinol-formaldehyde, melamine-formaldehyde, glyoxals and carbamates to improve the water resistance of the ink. In another example, U.S. Pat. No. 4,310,356 discloses a water based news print ink prepared using pigment and starch. The inks, however, are not fully suitable for printing on corrugated substrates owing to their poor drying, rub resistance, hiding power and foaming properties.

It is an object of the present invention to provide printing ink and coating compositions designed to print on towel, tissue, corrugated substrates and other porous substrates, offering improvements in chemical resistance, solubility, ink strength, pigment loading, pH stability, higher coefficient of friction, and heat resistance. Such printing ink compositions would also offer improved repulpability of substrates or materials printed with such compositions. Another object of the present invention is to eliminate the need for incorporating excess amine in acrylic based formulas to solubilize the acrylate and thus reduce any odor otherwise generated by such amines.

BRIEF SUMMARY OF THE INVENTION

Provided is an aqueous printing ink and coating composition containing a colorant, one or more high molecular weight starches and one or more water soluble acrylic polymers or co-polymers. The aqueous inks are useful for printing on cellulosic substrates, such as towel and tissue substrates, which exhibit improvements in properties including the repulpability of such substrates. Such characteristics include, for instance, the ability to be printed on corrugated substrates and exhibit improvements in gloss, chemical resistance, solubility, the elimination of excess amines to achieve solubility and thereby reduce odor, increased ink strength, pigment loading, pH stability, higher coefficient of friction and heat resistance. The compositions exhibit an ability for printing on corrugated substrates. The printing inks or coatings formulated exploit the synergistic benefits of combining the starch and acrylics without grafting one on the other.

DESCRIPTION OF THE INVENTION

The aqueous printing ink and coating compositions contain colorant, high molecular weight starch and water soluble acrylic polymer and are useful for printing on conventional towel, tissue and corrugated substrates, as well as other porous substrates such as, for instance, paper. They improve the repulpability of substrates or materials printed with such compositions. Furthermore, these inks and coatings contain a lower amount of amine resulting in less odor and a more stable pH.

The high molecular weight starches, or polysaccharides, suitable for use in the present invention are derived from an abundance of renewable natural products such as corn, potatoes, wheat, maize, rice, sago, sorghum and tapioca; also included are starch degradation products such as dextrin, thin boiling starches, maltodextrins and polysaccharides such as polymers of sugar. Additional starches suitable for use in the present invention are described, for example, in U.S. Pat. No. 6,620,880. As used herein, the term "high molecular weight" means a number average of at least about 100,000, preferably at least about 200,000, and most preferably at least about 250,000. A single starch or a combination of starches may be employed. A particularly preferred source of high molecular weight starch is LPR41 polysaccharide, a dispersion of starch from corn in polyethylene glycol and water, available from Lorama Chemicals.

The amount of high molecular weight starch to be used will vary with factors such as, for example, the type of starch, the type and amount of colorant, the type and amount of acrylic, and other solids. The term "solids" as used herein refers to the starch, acrylic, colorant and any other non-volatile ingredients which optionally may be added to the composition. In general, the amount of high molecular weight starch, such as waxy corn starch, is about 5 to 26 wt. %, based on the total weight % of the composition, although higher or lower amounts may also be applicable in some compositions. The preferred amount of starch is about 10.0 to 15.0 wt. %.

The binder polymer or polymers are obtained from mono-ethylenically unsaturated monomers and known colloquially as "acrylics". They are usually copolymers of at least two alkyl esters of one or more mono-ethylenically unsaturated carboxylic acids, such as for instance methyl methacrylate/butyl acrylate copolymer, but may also be homopolymers. Any water soluble acrylic polymer which has previously been used as a binder polymer can be employed, such as, for example, acrylic polymers and co-polymers, styrene acrylic emulsions, acrylic amide copolymers and co-polymers and/or acrylic colloidal dispersions. The amount of polymer will vary with factors such as, for example, the type and amount of starch, the type of polymer, the type and amount of colorant and other solids. In general, the preferred amount of polymer or co-polymer is about 7.0 to 25.0 wt. %. The more preferred amount is about 8.0 to 15.0 wt. %. It is noted that if lower amounts of polymer or co-polymer are used, the amount of starch, colorant and/or other solids should be increased proportionately to obtain adequate color density and printability.

The colorant suitable for use in the present invention may be a carbon black or any other inorganic pigment, an organic pigment, a dye or mixtures of pigments and/or dyes. The colorant may be in the form of a dry powder, dispersion, flush or any other conventional form. Suitable pigments include but are not limited to organic or inorganic pigments. Usable organic pigments include a pigment or a blended combination of the following non-limiting examples: Pigment Yellows #12, 13, 14, 17, 74, 83; Pigment Reds #2, 22, 23, 48:1, 48:2, 52, 53, 57:1, 122, 166, 170, 266; Pigment Orange #5, 16, 34, 36; Blue #15:3, 15:4; Violet #3, 27; and/or Pigment Green #7. Inorganic pigments may be one of the following non-limiting pigments: iron oxides, Pigment White #6, 7 and/or Pigment Black #7. Other organic and inorganic pigments appropriate for the colors desired can also be used. The amount of colorant used is generally about 2 to 20 wt. %, and more preferably about 5 to 13 wt. %.

Further additives which may be employed as desired to impart various properties to the printing ink and coating compositions of the present invention include surface tension modifiers, defoamers, wax or wax substance such as polyethylene wax, preservatives, biocides, dispersants, thickeners and cross-linking agents. Any of the known additives typically employed in aqueous inks and coatings can be used.

Any printable porous substrate can be printed with the composition described above by any known conventional technique. The ink is particularly useful in connection with corrugated paper or paperboard products, other cellulosic substrates, and paper products which may be subjected to recycling.

The combination of high molecular weight starches and acrylic polymers imparts desired physical and chemical properties to the printing ink and coating such as improvements in chemical resistance, re-solubility, repulpability, ink strength and pigment loading, pH stability, higher coefficient of friction and heat resistance. In addition, such compositions eliminate the need to employ an excess of amine for acrylic based compositions and thereby reduces any odor otherwise generated from such amines. As used herein, the "repulpability" of a printed material or substrate is determined by measuring/evaluating the reusability of an unwanted or discarded printed material or substrate (e.g. paper fibers) after the maximum amount of colorant (e.g. pigment) has been extracted from such printed material or substrate.

The ink and coating compositions of the present invention are further illustrated by the following non-limiting examples in which all parts and percentages are by weight, unless otherwise indicated.

Example I

Three corrugated printing ink compositions designated as A, B and C were prepared using the components and parts by weight shown below in Table I:

TABLE I

| Components | Ink A | Ink B (Comparative) | Ink C (Comparative) |
|---|---|---|---|
| Lithol rubine dispersion (about 20% pigment) | 40 | 40 | 40 |
| Starch (Lorama LPR41) | 55.62 | | |
| Varnish containing Vancryl 989 acrylic/acrylic from Johnson Polymer | | 60 | |

TABLE I-continued

| Components | Ink A | Ink B (Comparative) | Ink C (Comparative) |
|---|---|---|---|
| Varnish containing Vancryl 989/Joncryl 91 acrylics | | | 60 |
| Surfactant (Surfynol 104 H from Air Products) | 0.6 | | |
| Defoamer (Rhodiline 999 available from Rhone-Poulenc) | 0.6 | | |
| Defoamer (PI 40 available from Ultra Additives) | 0.18 | | |
| Polyethylene wax | 3 | | |
| Total | 100% | 100% | 100% |

Example II

The three printing ink compositions prepared in Example I were tested for viscosity and pH stability, mileage and color strength. After the initial pH was noted, stability was determined by heating the ink to 115°-120° F. (ca. 46-48° C.) and agitated at 4000 rpm for 4.5 hours, and then allowed to cool to room temperature overnight. The dilution data is reflective of the amount of ink which will be consumed for a specific length of paper.

The results of each test are described below in Table II.

TABLE II

| Properties | Ink A | Ink B (Prior Art) | Ink C (Prior Art) |
|---|---|---|---|
| Viscosity (Sig. Zahn#3) | 35.6" | 22.5" | 9.9" |
| pH (initial/final) | 8.42/8.31 | 8.71/8.26 | 8.71/8.26 |
| Dilution (g $H_2O$/100 g ink) | 15 | 6 | 0 |
| Color Strength | | | |
| A. Drawdown on Leneta 3NT-3 Densitometer | 2.49 | 2.39 | 2.54 |
| B. Pamarco proofs on Kraft, Mottled, Bleached substrate relative to Ink B (Side by side visual assessment) | Equal color strength with different shade | | |
| C. Pamarco proofs on Kraft, Mottled, Bleached substrate relative to Ink C (Side by side visual assessment) | Equal color strength at equal pigmentation | | |

Example III

Three coating compositions designated as D, E and F were prepared using the following components shown below in Table III:

TABLE III

| Components | Coating D Comparative | Coating E Comparative | Coating F |
|---|---|---|---|
| Acrylic 1 (I 12184 available from Rohm and Haas) | 61.00 | | |

TABLE III-continued

| Components | Coating D Comparative | Coating E Comparative | Coating F |
|---|---|---|---|
| Acrylic 2 (I 545 available from Rohm and Haas) | | 47.00 | |
| Acrylic 3 (Vancryl K762 available from UCB) | 26.40 | 26.50 | 54.00 |
| LPR41 Polysaccharide (Lorama) | 33.40 | | |
| Defoamer (PI 40 -- Ultra Additive) | 1.20 | 0.90 | 1.20 |
| Water | 1.60 | 14.50 | 1.60 |
| Polyethylene wax | 9.80 | 9.10 | 9.80 |
| Zinc crosslinking agent (Chemcor) | 000.00 | 2.00 | |
| Total | 100.00 | 100.00 | 100.00 |

Example IV

The following two coating compositions were prepared:

Composition G (Comparative):

| | |
|---|---|
| Rhoplex I545 (acrylic polymer - Rohm & Haas) | 47.00 |
| Vancryl K762 (acrylic polymer - Air Products) | 26.50 |
| Water | 14.50 |
| Polyethylene wax | 9.10 |
| zinc oxide | 2.00 |
| Rhodoline 999 (defoamer - Rhone Poulenc) | 0.90 |
| | 100.00 |

| Composition H | Weight % |
|---|---|
| Joncryl 70 (acrylic - Johnson Polymer) | 41.00 |
| LPR41 (polysaccharide - Lorama) | 20.00 |
| Vancryl K762 (acrylic - Air Products) | 29.00 |
| Water | 9.00 |
| Propylmatte 31 (wax - Micro Powders) | 1.00 |
| | 100.00 |

Comparative composition G had a pH of 8.8 and a viscosity (Signature #3 cup) of 16 seconds whereas composition H had a pH of 8.1 and a viscosity of 24 seconds.

The compositions were coated on corrugated board and evaluated. The results are shown in Table IV below.

In the water drop test, one drop of water was applied to the surface of dried print, and thereafter a single wipe made with an absorbent substance and both the absorbent and print examined for any sign of bleeding. To determine hot rub resistance, two printed corrugated samples were placed face to face on a Sutherland Rub Tester and rubbed against each other at 450° F. (ca. 232° C.) and then visually examined for signs of marring. Slide angle represents the degree of elevation when two face to face printed boards began to slide and is a method of measuring the coefficient of static friction by resistance. To determine hot block resistance, a print about four inches long was folded so that the test material was face to face and then a heated element was pressed against the folded board, after which the ability to unfold after cooling evaluated. In the wet block test, two squares of printed board were sprayed evenly with water, placed face to face and after being allowed to sit overnight under a one pound weight, the squares are pulled apart and the damage assessed.

TABLE IV

| Test | Composition G (comparative) | Composition H |
|---|---|---|
| Water Drop Test | Pass | Pass |
| Hot Rub Resistance | Slight marring | No marring |
| 60° Gloss | 51 | 60 |
| Aged Gloss @ 50° C., 1 day | No drop in gloss | No drop in gloss |
| Slide Angle, degrees | 30 | 28 |
| Hot Block Resistance - 300° F. (ca. 148° C.), 1 sec., 40 lb. (ca. 18.14 kg) | Fail | Pass |
| Wet Block Resistance | Fail | Pass |

Example V

Four towel and tissue printing ink compositions designated as I, J, K and L were prepared according to the present invention using the varnish shown below in Table V:

TABLE V

| Components | |
|---|---|
| Acrylic resin solution (C-44 from Ciba) | 22.40 |
| Glycerine | 11.70 |
| PTFE wax emulsion | 2.50 |
| Surfactant 1 (Air Products) | 0.40 |
| Surfactant 2 (Air Products) | 0.30 |
| Triethanolamine | 1.20 |
| LPR41 polysaccharide resin solution (from Lorama) | 13.90 |
| Defoamer (DrewPlus L418 from Ashland) | 0.10 |
| Water | 47.50 |
| Total | 100.00 |

Inks were then prepared by combining 85% varnish of Table V with 15% of the following colorants:

| | |
|---|---|
| Yellow dispersion (Sun Chemical) | Ink I |
| Litho Rubine dispersion (Sun Chemical) | Ink J |
| Cyan Blue dispersion (Sun Chemical) | Ink K |
| Black dispersion (Sun Chemical) | Ink L |

For comparison purposes, four towel and tissue printing ink compositions designated M, N, O and P were prepared by combining 87.5 parts of a polyamide resin-containing varnish with 12.5 parts of the same colorants.

| | |
|---|---|
| Yellow dispersion | Ink M |
| Litho Rubine dispersion | Ink N |
| Cyan Blue dispersion | Ink O |
| Black dispersion | Ink P |

Example VI

The eight ink compositions prepared in Example V were tested for chemical rub resistance, and repulpability. To determine rub resistance, prints on paper were immersed in a commercial household cleaner sold under the trademark "Formula 409" for 1 minute, then blotted and examined for bleeding (none bleed) then the print was subjected to 3-4 cycles on a Sutherland Rub Tester and the resistance to ink run-off rated on a scale of 1 to 10 with 1 being the best.

The results of these tests are described below in Table VI.

TABLE VI

|  | Invention | | | | Comparative | | | |
| --- | --- | --- | --- | --- | --- | --- | --- | --- |
| Ink | I | J | K | L | M | N | O | P |
| Rub Resistance | 2 | 3 | 2 | 2 | 4 | 3 | 3 | 3 |
| Repulpability[1] | 4 | 4 | 2 | 4 | 8 | 8 | 9 | 4 |

[1]Repulpability was determined by blending and mixing a printed tissue sample with sodium hypochlorite-containing water. Hot aqueous KOH (pH 12) is added and mixed with the blend. Sodium bisulfite or KOH was added as necessary to realize a pH between 6 and 7. The resulting mixture were then poured over a mesh netting. Using light pressure, the solids remaining on top of the mesh netting were collected, placed in a container and allowed to dry then carefully examined for their colorant content. The results were rated on a scale of 1 to 10 with 1 being the best.

Example VII

The preparation of Ink A is repeated substituting the same amount of Zeina B860 (National Starch) for the LPR41 starch.

Example VIII

The preparation of Ink A is repeated substituting one half of the PLR41 starch with Zeina B860 starch (National Starch).

Now that the preferred embodiments of the present invention have been described in detail, various modifications and improvements thereon will become readily apparent to one of ordinary skill in the art. Therefore, the spirit and scope of the invention are to be limited only by the appended claims and not by the foregoing specification.

What is claimed is:

1. An aqueous printing ink composition comprising:
   2 to 20 wt. % of a colorant;
   5 to 26 wt. % of a high molecular weight starch having a number average molecular weight of at least about 100,000 to about 2,500,000;
   7 to 25 wt. % of a water soluble acrylic polymer binder; and
   wherein:
   the colorant is in the form of a dry powder, a dispersion, or a flush,
   the high molecular weight starch is selected from among waxy corn, potato, wheat, rice, sago, sorghum and tapioca.

2. The aqueous printing ink composition of claim 1 in which the high molecular weight starch has a number average molecular weight of at least about 200,000.

3. The aqueous printing ink composition of claim 2 in which the high molecular weight starch has a number average molecular weight of at least about 250,000.

4. The aqueous printing ink composition of claim 3 in which the acrylic polymer comprises an acrylic copolymer.

5. The aqueous printing ink composition of claim 1 in which the amount of colorant is about 5 to 13 weight %, the starch is corn starch and the amount of starch is about 10 to 13%, and the amount of polymer is about 8 to 15 weight %.

6. The aqueous printing ink composition of claim 1, wherein the varnish is amine-free.

7. The aqueous printing ink composition of claim 1, wherein the high molecular weight starch and water soluble acrylic polymer are combined without grafting one on the other.

8. The aqueous printing ink composition of claim 1, comprising at least one of (i) rub resistance of 2-3 when subjected to a Sutherland Rub Tester (ii) passing a hot block resistance test, (iii) no bleeding after drying, on a corrugated substrate, wherein said aqueous printing ink composition is a porous substrate printing ink composition.

9. A method of printing comprising applying the printing ink composition of claim 1 to a porous substrate.

10. The method of printing of claim 9 in which the high molecular weight starch has a number average molecular weight of at least about 200,000.

11. A porous substrate having thereon a dried printing ink composition of claim 1.

12. The substrate of claim 11 in which the high molecular weight starch has a number average molecular weight of at least about 200,000.

13. The substrate of claim 11, wherein: the amount of colorant in the ink composition is about 2 to 20 weight %; the starch in the ink composition is waxy corn starch having a number average molecular weight of at least about 200,000; and the amount of starch in the ink composition is about 5 to 26 weight %.

14. A method of preparing an aqueous printing ink composition of claim 1, comprising combining a colorant-free varnish which comprises 5 to 26 weight % of a high molecular weight waxy corn, potato, wheat, rice, sago, sorghum or tapioca starch having a number average molecular weight of at least about 100,000 to about 2,500,000 and 7 to 25 weight % of a water soluble acrylic polymer binder with 2 to 20 weight of a colorant dispersion.

15. The method of claim 14 in which the high molecular weight starch has a number average molecular weight of at least about 200,000.

16. The method of claim 15 in which the high molecular weight starch has a number average molecular weight of at least about 250,000.

17. The method of claim 16 in which the acrylic polymer comprises an acrylic copolymer.

18. The method of claim 14 in which the amount of colorant is about 5 to 13 weight %, the starch is waxy corn starch and the amount of starch is about 10 to 13 weight %, and the amount of polymer is about 8 to 15 weight %.

19. The method of claim 14 in which the acrylic polymer comprises an acrylic copolymer.

20. The method of claim 19 in which the amount of colorant is about 5 to 13 weight %, the starch is waxy corn starch and the amount of starch is about 10 to 13 weight %, and the amount of polymer is about 8 to 15 weight %.

* * * * *